US012570080B2

(12) United States Patent
Nagami et al.

(10) Patent No.: US 12,570,080 B2
(45) Date of Patent: Mar. 10, 2026

(54) RESIN LAMINATE, PACKAGING CONTAINER, AND PRODUCTION METHOD FOR RESIN LAMINATE

(71) Applicant: Fujimori Kogyo Co., Ltd., Tokyo (JP)

(72) Inventors: Chisato Nagami, Yokohama (JP); Junko Fuchu, Tokyo (JP); Atsushi Manabe, Tokyo (JP); Takahisa Nagai, Kariya (JP)

(73) Assignee: ZARCOS Corporation, Tokyo (JP)

( * ) Notice: Subject to any disclaimer, the term of this patent is extended or adjusted under 35 U.S.C. 154(b) by 110 days.

(21) Appl. No.: 18/014,713

(22) PCT Filed: Jul. 8, 2021

(86) PCT No.: PCT/JP2021/025739
§ 371 (c)(1),
(2) Date: Jan. 5, 2023

(87) PCT Pub. No.: WO2022/009947
PCT Pub. Date: Jan. 13, 2022

(65) Prior Publication Data
US 2023/0294388 A1 Sep. 21, 2023

(30) Foreign Application Priority Data

Jul. 9, 2020 (JP) ................................. 2020-118202

(51) Int. Cl.
*B32B 27/32* (2006.01)
*B32B 27/08* (2006.01)
(Continued)

(52) U.S. Cl.
CPC .............. *B32B 27/32* (2013.01); *B32B 27/08* (2013.01); *B32B 37/153* (2013.01);
(Continued)

(58) Field of Classification Search
None
See application file for complete search history.

(56) References Cited

U.S. PATENT DOCUMENTS 6,294,266 B1 9/2001 Hashimoto et al.
2004/0115353 A1* 6/2004 Nakanishi ........... C23C 18/2086
427/306
(Continued)

FOREIGN PATENT DOCUMENTS

CN 110023201 A 7/2019
DE 102016000223 A1 7/2017
(Continued)

OTHER PUBLICATIONS

European Search Report from European Patent Office for Application No. 21838412.1 dated Jun. 13, 2024.
(Continued)

*Primary Examiner* — Ramsey Zacharia
(74) *Attorney, Agent, or Firm* — Harris Beach Murtha Cullina PLLC

(57) ABSTRACT

There is provided a resin laminate including: at least a first layer; a second layer; and an intermediate layer laminated in contact with the first layer and the second layer, in which a surface of the first layer in contact with the intermediate layer is an oxidized surface, a surface of the intermediate layer in contact with the first layer is an oxidized surface, the first layer is a layer in which a thermoplastic resin is used as a forming material or a layer in which cellophane is used as a forming material, and the intermediate layer is made of polyethylene having a density of 0.915 g/cm3 or less.

12 Claims, 2 Drawing Sheets

(51) Int. Cl.
    *B32B 37/15*         (2006.01)
    *B32B 37/24*         (2006.01)
    *B32B 38/18*         (2006.01)

(52) U.S. Cl.
    CPC .... *B32B 38/1808* (2013.01); *B32B 2037/243* (2013.01); *B32B 2250/03* (2013.01); *B32B 2250/24* (2013.01); *B32B 2255/10* (2013.01); *B32B 2255/26* (2013.01); *B32B 2307/72* (2013.01); *B32B 2307/7242* (2013.01); *B32B 2307/7265* (2013.01)

(56)           References Cited

U.S. PATENT DOCUMENTS

| | | | |
|---|---|---|---|
| 2011/0158559 A1* | 6/2011 | Nicolais | B65D 75/56 |
| | | | 493/243 |
| 2013/0040155 A1* | 2/2013 | Knauf | B32B 29/002 |
| | | | 156/244.11 |
| 2018/0001605 A1* | 1/2018 | Brown | B32B 7/12 |
| 2020/0031562 A1* | 1/2020 | Rabiea | B32B 3/06 |

FOREIGN PATENT DOCUMENTS

| | | | |
|---|---|---|---|
| JP | 07314629 A | 12/1995 | |
| JP | 11147295 A | 6/1999 | |
| JP | 2001191452 A | 7/2001 | |
| JP | 2001341249 A | 12/2001 | |
| JP | 2002019060 A | 1/2002 | |
| JP | 2003062957 A | 3/2003 | |
| JP | 2005053997 A | 3/2005 | |
| JP | 4163112 B | 10/2008 | |
| JP | 2012081615 A | 4/2012 | |
| JP | 2018184006 A | 11/2018 | |
| WO | 03031512 A1 | 4/2003 | |

OTHER PUBLICATIONS

International Search Report for Application No. PCT/JP2021/025739 dated Sep. 21, 2021 with English Translation.
Search Report from Chinese Patent Office for Application No. 202180048080.6 dated Mar. 29, 2025 (translation provided).
Plasma Science and Technology and Its Application in Industry, Yuanjing Ge et al, Beijing, China Light Industry Press, pp. 229-238, publication date: Jan. 31, 2011.
Decision of Rejection from Chinese Patent Office for Application No. 202180048080.6 dated Jan. 1, 2026.

* cited by examiner

RESIN LAMINATE, PACKAGING CONTAINER, AND PRODUCTION METHOD FOR RESIN LAMINATE

FIELD OF THE INVENTION

The present invention relates to a resin laminate, a packaging container, and a production method for a resin laminate.

BACKGROUND OF THE INVENTION

A laminate of two or more types of resins (resin laminate) is used as a material for packaging containers for various liquid products such as liquid seasonings, liquid detergents, and liquid cosmetics.

Conventionally, as the resin laminate described above, a laminate having a configuration in which two or more types of resin films are laminated together via an adhesive or an anchor coating agent is known. A resin laminate produced using an adhesive or an anchor coating agent can sufficiently increase the peel strength between resin films. On the other hand, when an adhesive or an anchor coating agent is used, volatile organic compounds (VOC) are generated during the production process of the resin laminate.

On the other hand, in recent years, from the viewpoint of work environment preservation and environmental protection, techniques for producing resin laminates without generating VOCs while ensuring peel strength have been studied. For example, a production method is known in which at least one surface of a plastic base is oxidized, at least one surface of a melt-extruded film is ozone-treated, and the plastic base and the melt-extruded film are brought into contact and pressed together (for example, refer to Japanese Unexamined Patent Application, First Publication No. H7-314629).

SUMMARY OF THE INVENTION

However, according to the inventor's study, the peel strength of the laminate obtained by the method described in the above-mentioned Patent Document may be insufficient, and a resin laminate with more reliable peel strength is required.

The present invention has been made in view of such circumstances, and an object thereof is to provide a resin laminate exhibiting sufficient peel strength without using an adhesive or an anchor coating agent. Another object of the present invention is to provide a packaging container using such a resin laminate as a material. Still another object of the present invention is to provide a production method for a resin laminate in which peel strength is ensured and a resin laminate is produced without generating VOCs.

In order to solve the above problems, one aspect of the present invention includes the following aspect.

[1] A resin laminate including: at least a first layer; a second layer; and an intermediate layer laminated in contact with the first layer and the second layer, in which a surface of the first layer in contact with the intermediate layer is an oxidized surface, at least a surface of the intermediate layer in contact with the first layer is an oxidized surface, the first layer is a layer in which a thermoplastic resin is used as a forming material or a layer of in cellophane is used as a forming material, and the intermediate layer is made of polyethylene having a density of 0.915 g/cm$^3$ or less.

[2] The resin laminate according to [1], in which the thermoplastic resin is at least one selected from the group consisting of polyethylene terephthalate, polyamide, polyethylene naphthalate, polyacrylonitrile, polycarbonate, polyimide, polyethylene, polypropylene, and cyclic polyolefins.

[3] The resin laminate according to [1] or [2], in which at least one selected from the group consisting of polyethylene, polypropylene, and cyclic polyolefins is used as a forming material of the second layer.

[4] The resin laminate according to [3], in which the second layer has a barrier coating layer on the intermediate layer side.

[5] The resin laminate according to [1] or [2], in which the second layer is a layer in which a barrier material is used as a forming material.

[6] The resin laminate according to any one of [1] to [5], in which the first layer has a barrier coating layer on the surface thereof.

[7] The resin laminate according to any one of [1] to [5], in which the first layer is a layer in which a barrier material is used as a forming material.

[8] The resin laminate according to any one of [1] to [7], further including: a printing layer laminated on the first layer.

[9] The resin laminate according to [8], in which the printing layer is provided between the first layer and the intermediate layer.

[10] A packaging container in which the resin laminate according to any one of [1] to [9] is used as a material, in which the second layer faces an inside of the container.

[11] A production method for a resin laminate in which a first film and a second film are laminated without interposing an adhesive or an anchor coating agent, the method including: a step of subjecting a surface of the first film to atmospheric pressure plasma treatment under a nitrogen atmosphere or a mixed atmosphere of nitrogen and hydrogen; and a step of sandwiching a molten resin film between the first film and the second film to laminate the first film and the second film, in which the first film is a thermoplastic resin film or a cellophane film, the molten resin film is made of polyethylene having a density of 0.915 g/cm$^3$ or less, and in the laminating step, the surface of the first film, which has been subjected to the atmospheric pressure plasma treatment, is opposed to the second film, and while at least the surface of the molten resin film in contact with the first film is subjected to ozone treatment, the molten resin film is melt-extruded between the first film and the second film and continuously laminated.

[12] The production method for a resin laminate according to [11], in which a processing temperature of the molten resin film is 280° C. or higher and 350° C. or lower.

[13] The production method for a resin laminate according to [11] or [12], in which at least one selected from the group consisting of polyethylene terephthalate, polyamide, polyethylene naphthalate, polyacrylonitrile, polycarbonate, polyimide, polyethylene, polypropylene, and cyclic polyolefin is used as a forming material of the thermoplastic resin film.

[14] The production method for a resin laminate according to any one of [11] to [13], in which the second film is one selected from the group consisting of an unstretched polyethylene resin film, an unstretched polypropylene resin film, a cyclic polyolefin resin film, and a coextruded film of unstretched polyethylene and unstretched polypropylene.

[15] The production method for a resin laminate according to [13], in which the second film has a barrier coating layer on a surface in contact with the molten resin film.

[16] The production method for a resin laminate according to any one of [11] to [14], in which a barrier material is used as a forming material of the second film.

[17] The production method for a resin laminate according to any one of [11] to [16], in which the first film has a barrier coating layer on a surface thereof.

[18] The production method for a resin laminate according to any one of [11] to [16], in which a barrier material is used as a forming material of the first film.

According to the present invention, it is possible to provide a resin laminate exhibiting sufficient peel strength without using an adhesive or an anchor coating agent. Moreover, it is possible to provide a packaging container using such a resin laminate as a material. In addition, it is possible to provide a production method for a resin laminate in which peel strength is ensured and a resin laminate is produced without generating VOCs.

DETAILED DESCRIPTION OF THE INVENTION

Hereinafter, resin laminates according to embodiments of the present invention will be described with reference to the drawings. In addition, in all the drawings below, the dimensions and ratios of the constituent elements are appropriately changed in order to make the drawings easier to see.

Figure 1:
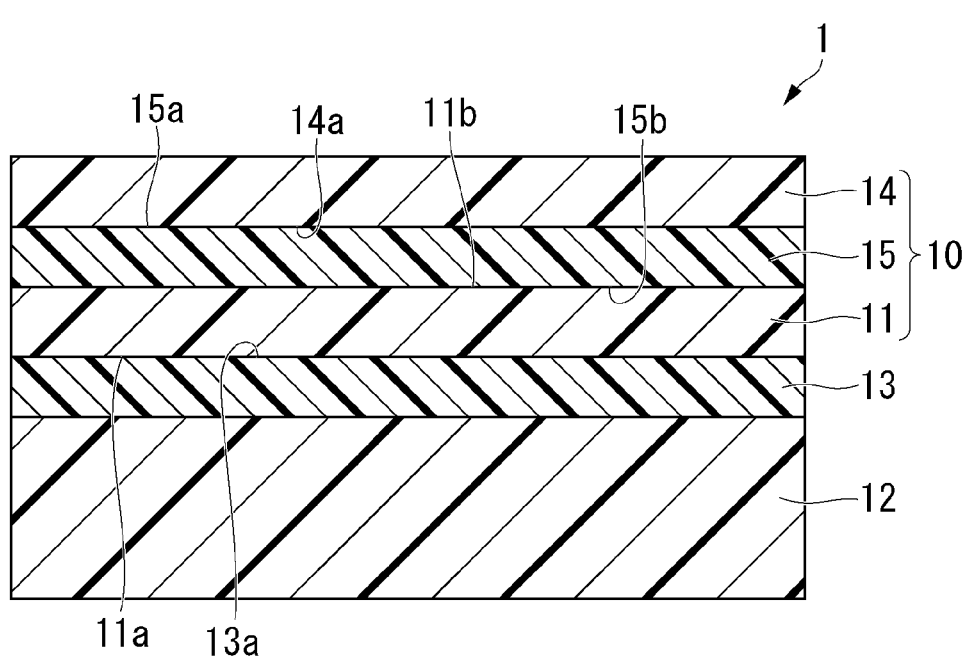
FIG. 1 is a schematic cross-sectional view showing a resin laminate of the present embodiment.

FIG. 1 is a schematic cross-sectional view showing a resin laminate 1 of the present embodiment. The resin laminate 1 has a first layer 11, a second layer 12, and a first intermediate layer 13. The first intermediate layer corresponds to the "intermediate layer" in the present invention.

Furthermore, the resin laminate 1 may have a printing layer 14 and a second intermediate layer 15. A configuration including the first layer 11, the printing layer 14, and the second intermediate layer 15 is referred to as a base 10.

First Layer

The first layer 11 is a layer in which a thermoplastic resin is used as a forming material or a layer in which cellophane is used as a forming material.

Thermoplastic resin is preferably at least one selected from the group consisting of polyethylene terephthalate (PET), polyamide (PA), polyethylene naphthalate (PEN), polyacrylonitrile (PAN), polycarbonate (PC) and polyimide (PI), polyethylene (PE), polypropylene (PP) and cyclic polyolefins (COP, COC).

The melting points of each of these thermoplastic resins are 252° C. for polyethylene terephthalate, 220° C. for polyamide, approximately 270° C. for polyethylene naphthalate, approximately 130° C. for polyethylene, and approximately 160° C. for polypropylene. Among the thermoplastic resins described above, the melting points of polyacrylonitrile, polycarbonate, polyimide, and cyclic polyolefins cannot be measured (they do not have melting points).

Polyamide is a linear polymer of which a main chain is composed of repeating amide bonds (—CONH—) formed by the reaction of an acid and an amine. A common trade name for polyamide is nylon.

The first layer 11 may have a barrier coating layer on the surface thereof. In this case, the first layer has a laminated structure of a main layer in which thermoplastic resin or cellophane is used as a forming material, and a barrier coating layer provided on the surface. The barrier coating layer may be provided on one surface 11a (the surface in contact with the first intermediate layer 13) of the first layer 11, and may be provided on the other surface 11b (the surface in contact with the second intermediate layer 15), on the first layer 11.

The barrier coating layer can be formed by applying a barrier coating agent to the surface of the main layer. The barrier coating agent exhibits barrier properties by drying and curing.

The barrier coating agent includes a polymer compound containing a reactive functional group, and a reactive coating agent containing a crosslinkable compound such as a metal compound and polyisocyanate. The reactive coating agent can exhibit barrier properties by reacting the crosslinkable compound with the reactive functional group to crosslink the polymer compound. Examples of a reactive functional group which can react with a crosslinkable compound include a hydroxyl group, a carboxyl group, and an amino group.

Examples of polymer compounds that react with reactive functional groups include one or more of polyvinyl alcohol, an ethylene-vinyl alcohol copolymer (EVOH), urethane-based polyol compounds, acrylic-based polyol compounds, epoxy-based polyol compounds, polyacrylic acid, an acrylic acid-acrylate copolymer, polysaccharides, and compounds containing oxazoline groups.

Examples of a metal compound used as the crosslinkable compound include one or more of metal alkoxides, metal halides, and metal chelate compounds. Examples of metal elements contained in the metal compound include silicon, titanium, zirconium, tin, and aluminum. Examples of metal alkoxides include metal methoxides, ethoxides, propoxides, isopropoxides, butoxides, and phenoxides. Examples of metal halides include fluorides, chlorides, bromides, and iodides. Examples of chelate compounds include metal complexes containing hydroxycarboxylic acids such as lactic acid, aminocarboxylic acids, and phosphoric acids, as chelating ligands.

Examples of polyisocyanate used as the crosslinkable compound include one or more of diisocyanate compounds such as hexamethylene diisocyanate, tolylene diisocyanate, xylylene diisocyanate, and isophorone diisocyanate, and polyisocyanate compounds obtained as derivatives of diisocyanate compounds.

The barrier coating agent may be a coating agent containing a barrier polymer compound. Examples of barrier polymer compounds include polyvinylidene chloride, polyvinyl alcohol, and an ethylene-vinyl alcohol copolymer (EVOH). A barrier coating layer can be formed by applying a paint obtained by dissolving or dispersing a barrier polymer compound in a solvent and then volatilizing the solvent.

The barrier coating agent may contain water or an organic solvent as a solvent. Examples of organic solvents include one or more selected from alcohol solvents such as methanol, ethanol and 2-propanol; ketone solvents such as acetone and methyl ethyl ketone; glycol ether solvents such as 2-methoxyethanol and dimethoxyethane; ester solvents such as ethyl acetate; and aromatic solvents, such as toluene.

Barrier coating agents may contain additives such as inorganic compound particles such as silica and alumina, clay minerals, filling materials such as fillers, silane coupling agents, antioxidants, ultraviolet absorbers, light stabilizers, antistatic agents, colorants, a crosslinking agent, a crosslinking accelerator, and a curing agent. The barrier coating layer may contain a resin, or may be a barrier coating layer containing no resin.

The coating device for the barrier coating agent is not particularly limited, but includes gravure coaters, knife coaters, reverse coaters, bar coaters, spray coaters, spin coaters, die coaters, slit coaters, roll coaters, and dip coaters. When two or more barrier coating layers are laminated, a different coating device may be used for each barrier coating layer, or the same or the same type of coating device may be used.

The first layer 11 may have a metal vapor deposition layer on the other surface 11*b*. The surface 11*b* is the surface of the first layer 11 opposite to the surface in contact with the first intermediate layer 13. For example, an aluminum vapor deposition layer can be adopted as the metal vapor deposition layer. The metal vapor deposition layer functions as a barrier coating layer.

The first layer 11 may have a inorganic deposition layer on the other surface 11*b*. For example, a silicon oxide vapor deposition layer can be employed as the inorganic vapor deposition layer. The inorganic deposition layer functions as a barrier coating layer.

Alternatively, the first layer 11 may be a laminated film of a film having a barrier coating layer and a film having no barrier coating layer.

In addition, the first layer 11 may be formed using a material having a high barrier property (hereinafter referred to as a barrier material) as a material. In this case, the first layer 11 may be a multi-layer structure including a layer of barrier material.

Examples of barrier materials include an ethylene-vinyl alcohol copolymer (EVOH), polyvinylidene chloride (PVDC), polyvinyl alcohol (PVOH), and polyvinyl chloride (PVC).

The thickness of the first layer 11 is preferably 5 µm or more and 100 µm or less.

One surface 11*a* of the first layer 11 is subjected to oxidation treatment represented by plasma treatment. The surface 11*a* is the surface of the first layer 11 in contact with the first intermediate layer 13. By sum frequency generation spectroscopy, it is possible to confirm that the surface 11*a* is oxidized. In other words, the surface 11*a* is oxidized to the extent that the confirmation is possible by sum frequency generation spectroscopy. When the surface 11*a* is modified in a nitrogen atmosphere, the nitrogen molecules ($N_2$) in the atmosphere react with the thermoplastic resin exposed on the surface 11*a* to form new C—N bonds.

Examples of the oxidation treatment method include known corona treatment, plasma treatment, flame plasma treatment, electron beam irradiation, and ultraviolet irradiation.

The atmosphere of the oxidation treatment may be a nitrogen atmosphere as described above or a mixed atmosphere of nitrogen and hydrogen.

Second Layer

The second layer 12 functions as a sealant layer. At least one selected from the group consisting of polyolefins and biodegradable resins is used as a forming material of the second layer 12.

Examples of polyolefins include polyethylene, polypropylene, and cyclic polyolefins.

Examples of biodegradable resins include polylactic acid (PLA), polybutylene succinate (PBS), polybutylene succinate adipate (PBSA), and polybutylene adipate terephthalate (PBAT) and a poly(3-hydroxybutyrate-co-3-hydroxyhexanoate) copolymer resin (PHBH).

The thickness of the second layer 12 is preferably 10 µm or more and 500 µm or less.

The second layer 12 may have a barrier coating layer on the surface in contact with the first intermediate layer 13. In this case, the second layer has a laminated structure of a main layer in which at least one selected from the group consisting of polyolefins and biodegradable resins is used as a forming material, and a barrier coating layer provided on the first intermediate layer 13 side of the main layer.

The barrier coating layer can be formed by applying a barrier coating agent to the surface of the main layer. The barrier coating agent exhibits barrier properties by drying and curing. As the barrier coating agent, the same barrier coating agent provided as an example of the first layer 11 can be used.

The second layer 12 may have a metal vapor deposition layer as a barrier coating layer. For example, an aluminum vapor deposition layer can be adopted as the metal vapor deposition layer.

The second layer 12 may have an inorganic deposition layer as a barrier coating layer. For example, a silicon oxide vapor deposition layer can be employed as the inorganic vapor deposition layer.

In addition, the second layer 12 may be formed using a material having a high barrier property (hereinafter referred to as a barrier material) as a material. In this case, the second layer 12 may be a multi-layer structure including a layer of barrier material.

As the barrier material, the same barrier material provided as an example of the first layer 11 can be used.

First Intermediate Layer

The first intermediate layer 13 is in contact with the first layer 11 and the second layer 12 and laminated thereon.

In the resin laminate 1 of the present embodiment, the first layer 11 and the second layer 12 are laminated with the first intermediate layer 13 sandwiched therebetween. The inventors investigated a resin laminate that exhibits sufficient peel strength between the first layer 11 and the second layer without using an adhesive or an anchor coating agent, found that the density of the resin used for the intermediate layer (first intermediate layer 13) has an effect on the peel strength, and completed the present invention.

That is, the first intermediate layer 13 is made of polyethylene with a density of $0.915 \text{ g/cm}^3$ or less. The density of polyethylene, which is the forming material of the first intermediate layer 13, is preferably $0.910 \text{ g/cm}^3$ or less.

The polyethylene, which is the forming material of the first intermediate layer 13 may be composed of only one type of polyethylene, or may be a composition in which two or more types of polyethylene are mixed. That is, when the polyethylene, which is the forming material of the first intermediate layer 13, is a composition in which two or more types of polyethylene are mixed, the density of the composition as a whole is 0.915 g/cm³ or less.

The density of polyethylene, which is the forming material of the first intermediate layer 13, is 0.850 g/cm³ or more, preferably 0.880 g/cm³ or more.

The upper limit value and lower limit value of the density of low-density polyethylene can be combined in any manner.

The thickness of the first intermediate layer 13 is preferably 3 μm or more and 500 μm or less.

A surface 13a of the first intermediate layer 13 opposing the first layer 11 is subjected to oxidation treatment represented by ozone treatment. When the second layer 12 has a barrier coat, the surface of the first intermediate layer 13 opposing the second layer 12 may be subjected to oxidation treatment.

In the resin laminate 1, the first intermediate layer 13 is made of polyethylene having a density as described above, and the opposing surfaces of the first layer 11 and the first intermediate layer 13 are each oxidized. Accordingly, sufficient peel strength is exhibited at the interface between the first layer 11 and the first intermediate layer 13.

In the present embodiment, the peel strength can be measured according to the measurement method specified in JIS K 6854-1 "Adhesive Peel Adhesion Strength Test Method Part 1: 90 Degree Peel".

Printing Layer

The printing layer 14 is a layer on which characters and patterns are printed using printing ink on a surface 14a of a film in which a thermoplastic resin is used as a forming material.

In addition, in FIG. 1, the printing layer 14 is formed on the side opposite to the first layer 11 with respect to the second intermediate layer 15, but may be formed between the first layer 11 and the first intermediate layer 13.

The printing ink used for printing characters and patterns in the printing layer 14 may contain various ink binder resins such as thermoplastic resins, urethane resins, and acrylic resins as binder resins. Further, the printing ink contains additives such as various pigments, and desiccants, stabilizers.

Characters and patterns are formed on the printing layer 14 by known printing methods such as an offset printing method, a gravure printing method, and a screen-printing method. The thickness of the part constituting characters and patterns can be generally set to approximately 0.05 μm or more and 2.0 μm or less.

The thickness of the printing layer 14 is preferably 5 μm or more and 100 μm or less.

The surface 14a of the printing layer 14 may be subjected to oxidation treatment represented by plasma treatment, similarly to the one surface 11a of the first layer 11. The oxidation treatment can employ the above-described known method.

Second Intermediate Layer

The second intermediate layer 15 is in contact with the surface 11b of the first layer 11 and the surface 14a of the printing layer 14 and laminated with the first layer 11 and the printing layer 14.

As the forming material of the second intermediate layer 15, the material exemplified as the forming material of the first intermediate layer 13 can be used. The forming material of the second intermediate layer 15 and the forming material of the first intermediate layer 13 may be the same.

The thickness of the second intermediate layer 15 is preferably 10 μm or more and 500 μm or less.

A surface 15a of the second intermediate layer 15 opposing the printing layer 14 is subjected to oxidation treatment represented by ozone treatment. When the first layer 11 has a barrier coating layer on the other surface 11b, the surface 15b of the second intermediate layer 15 opposing the first layer 11 is also subjected to oxidation treatment represented by ozone treatment.

Packaging Container

Figure 2:
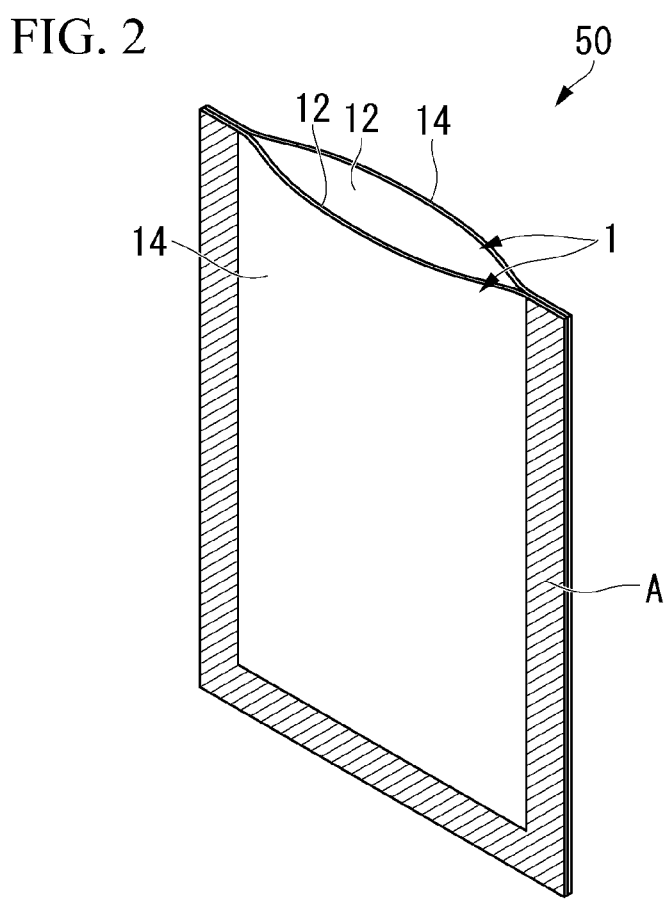
FIG. 2 is a schematic diagram showing a packaging container formed using the resin laminate.

FIG. 2 is a schematic diagram showing a packaging container 50 formed using the resin laminate 1 described above. In the packaging container 50, the second layer 12 of the resin laminate 1 faces the inside of the container, and the printing layer 14 is exposed outside the container.

The packaging container 50 is obtained by stacking two sheets of the resin laminate 1 cut to a predetermined size, with the second layers 12 opposing each other, and heat-sealing the three sides. In FIG. 2, the symbol A indicates the heat-sealed part.

Alternatively, the packaging container 50 may be a self-supporting standing pouch produced by a known method.

Production Method for Resin Laminate

Figure 3:
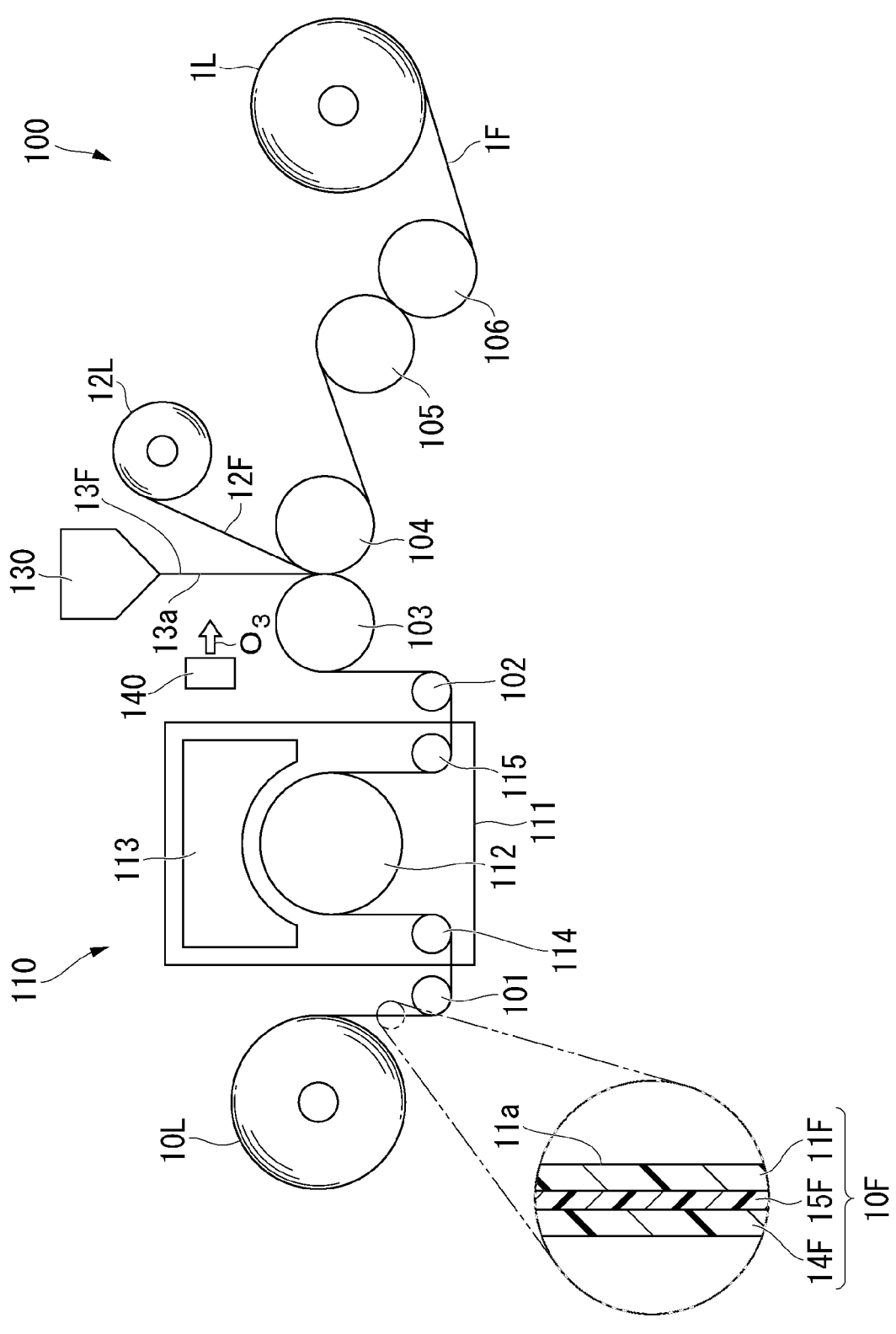
FIG. 3 is a process diagram showing a production method for the resin laminate of the present embodiment.

FIG. 3 is a process diagram showing a production method 100 for the resin laminate 1 of the present embodiment. The resin laminate 1 described above is produced by laminating the first film and the second film without using an adhesive or an anchor coating agent.

In the following description, an example in which atmospheric pressure plasma treatment and ozone treatment are adopted as oxidation treatment will be shown.

A base film 10F is a laminate having a first film 11F having the same configuration as the first layer 11 and formed in a belt shape; a printing layer 14F having the same configuration as the printing layer 14 and formed in a belt shape; and a second intermediate layer 15F having the same configuration as the second intermediate layer 15 and formed in a belt shape. When the base film 10F is cut into sheets, the base film 10F becomes the base 10 described above.

The first film 11F may have a barrier coating layer on the surface thereof. In this case, the first film 11F has a laminated structure of a main layer using thermoplastic resin or cellophane as a forming material, and a barrier coating layer provided on the surface of the main layer.

The first film 11F may use the barrier material described above as the forming material.

The base film 10F is successively unwound from an unwinding roll 10L wound into a roll, and transported into a plasma processing apparatus 110 via the transport roll 101.

The plasma processing apparatus 110 has a chamber 111, a roll 112, a plasma generation device 113, and transport rolls 114 and 115. The chamber 111 accommodates the roll 112, the plasma generation device 113, and the transport rolls 114 and 115.

The base film 10F transported into the plasma processing apparatus 110 is wound around the roll 112 via the transport roll 114. In the chamber 111, an atmosphere suitable for plasma generation conditions is formed.

The plasma generation device 113 is arranged to face the roll 112 and generates plasma in the space between the plasma generation device 113 and the roll 112. One surface of the base film 10F (one surface 11a of the first film 11F) is oxidized by the generated plasma.

The plasma treatment can be performed, for example, under atmospheric pressure conditions with an output of 60 W·min/m$^2$, a transport speed of 50 m/min, and an atmosphere gas of a mixture of nitrogen and hydrogen.

The base film 10F having one surface 11a oxidized is transported out from the plasma processing apparatus 110 via the transport roll 115.

The oxidation treatment of one surface 11a of the base film 10F may be performed continuously during the transportation process as described above, or may be performed in advance.

The base film 10F is supplied between the cooling nip rolls 103 and 104 via the transport roll 102.

A second film 12F wound into a roll is arranged near the cooling nip rolls 103 and 104. The second film 12F has the same configuration as the second layer 12 and is formed in a belt shape.

The second film 12F is preferably one selected from the group consisting of an unstretched polyethylene resin film, an unstretched polypropylene resin film, a cyclic polyolefin resin film, a coextruded film of unstretched polyethylene and unstretched polypropylene, and a biodegradable resin film.

The second film 12F may have a barrier coating layer on the surface in contact with the surface 13a of a molten resin film 13F (will be described later). In this case, the second film 12F has a laminated structure of a main layer in which at least one selected from the group consisting of polyolefins and biodegradable resins is used as a forming material, and a barrier coating layer provided on the molten resin film 13F side of the main layer.

The second film 12F may use the barrier material described above as the forming material.

The second film 12F is continuously unwound from an unwinding roll 12L and supplied between the cooling nip rolls 103 and 104.

Between the cooling nip rolls 103 and 104 and between the base film 10F and the second film 12F, the film-shaped molten resin film 13F is continuously extruded from an extruder 130 through a T-die.

The processing temperature of the molten resin film 13F by the extruder 130 is preferably 280° C. or higher, more preferably 290° C. or higher, and even more preferably 300° C. or higher. The processing temperature of the molten resin film 13F is preferably 350° C. or lower, more preferably 340° C. or lower, and even more preferably 320° C. or lower.

The upper limit value and the lower limit value of the processing temperature can be combined in any manner. That is, the processing temperature of the molten resin film may be 280° C. or higher and 350° C. or lower, 290° C. or higher and 340° C. or lower, or 300° C. or higher and 320° C. or lower.

An ozone treatment device 140 is arranged at a position facing the surface 13a of the molten resin film 13F. The ozone treatment device 140 continuously oxidizes the surface 13a of the molten resin film 13F with ozone.

In FIG. 3, only the surface 13a is oxidized using the ozone treatment device 140, but the present invention is not limited to this.

When the second film 12F has a barrier coating layer, or when a barrier material is used as a forming material of the second film 12F, the ozone treatment devices 140 may be respectively provided at positions facing both surfaces of the molten resin film 13F, and may oxidize both surfaces of the molten resin film 13F. Further, when both surfaces of the molten resin film 13F can be oxidized, the ozone treatment devices 140 may be devices which are not respectively provided at positions facing both surfaces of the molten resin film 13F, and oxidizes both surfaces with a single unit.

The base film 10F, the second film 12F, and the molten resin film 13F supplied between the cooling nip rolls 103 and 104 in this manner are not coated with any of an adhesive or an anchor coating agent at the interface thereof, and are continuously laminated passing between the cooling nip rolls 103 and 104. Thereby, an original fabric 1F of the resin laminate 1 described above is obtained.

The original fabric 1F is transported to the wound roll 1L via transport rolls 105 and 106, and wound into a roll.

The original fabric 1F becomes the resin laminate 1 described above by being appropriately cut into sheets. In addition, the original fabric 1F may be cut downstream of the process without being wound into a roll.

In the present embodiment, the resin laminate 1 is obtained as described above.

According to the resin laminate 1 having the above configuration, it is possible to provide a resin laminate exhibiting sufficient peel strength without using an adhesive or an anchor coating agent.

Further, according to the packaging container having the above configuration, by using the above-described resin laminate as a material, the packaging container exhibits sufficient peel strength and suppresses the emission of VOCs.

Moreover, according to the production method for a resin laminate as described above, it is possible to produce a resin laminate while ensuring the peel strength and without generating VOCs.

As one aspect, the present invention also includes the following aspects.

<1-1> A resin laminate including: at least a first layer; a second layer; and an intermediate layer laminated in contact with the first layer and the second layer, in which a surface of the first layer in contact with the intermediate layer is an oxidized surface, a surface of the intermediate layer in contact with the first layer is an oxidized surface, the first layer is a layer in which a thermoplastic resin is used as a forming material or a layer in which cellophane is used as a forming material, and the intermediate layer is made of polyethylene having a density of 0.850 g/cm$^3$ or more and 0.915 g/cm$^3$ or less.

<1-2> A resin laminate including: at least a first layer; a second layer; and an intermediate layer laminated in contact with the first layer and the second layer, in which a surface of the first layer in contact with the intermediate layer is an oxidized surface, a surface of the intermediate layer in contact with the first layer is an oxidized surface, the first layer is a layer in which a thermoplastic resin is used as a forming material or a layer in which cellophane is used as a forming material, and the intermediate layer is made of polyethylene having a density of 0.880 g/cm$^3$ or more and 0.910 g/cm$^3$ or less.

<2-1> A production method for a resin laminate in which a first film and a second film are laminated without interposing an adhesive or an anchor coating agent, the method including: a step of subjecting a surface of the first film to atmospheric pressure plasma treatment under a nitrogen atmosphere or a mixed atmosphere of nitrogen and hydrogen; and a step of sandwiching a molten resin film between the first film and the second film to laminate the first film and the second film, in which the first film is a thermoplastic resin film or a cellophane film, the molten resin film is made of polyethylene having a density of 0.850 g/cm$^3$ or more and 0.915 g/cm$^3$ or less, and in the laminating step, the surface of the first film, which has been subjected to the atmospheric pressure plasma treatment, is opposed to the second film, and while the surface of the molten resin film in contact with the first film is subjected to ozone treatment, the molten resin film is melt-extruded between the first film and the second film and continuously laminated.

<2-2> A production method for a resin laminate in which a first film and a second film are laminated without interposing an adhesive or an anchor coating agent, the method including: a step of subjecting a surface of the first film to atmospheric pressure plasma treatment under a nitrogen atmosphere or a mixed atmosphere of nitrogen and hydrogen; and a step of sandwiching a molten resin film between the first film and the second film to laminate the first film and the second film, in which the first film is a thermoplastic resin film or a cellophane film, the molten resin film is made of polyethylene having a density of 0.880 g/cm$^3$ or more and 0.910 g/cm$^3$ or less, and in the laminating step, the surface of the first film, which has been subjected to the atmospheric pressure plasma treatment, is opposed to the second film, and while the surface of the molten resin film in contact with the first film is subjected to ozone treatment, the molten resin film is melt-extruded between the first film and the second film and continuously laminated.

<2-3> The production method for a resin laminate according to <2-1> or <2-2>, in which the processing temperature of the molten resin film is 290° C. or higher and 340° C. or lower.

<2-4> The production method for a resin laminate according to <2-3>, in which the processing temperature of the molten resin film is 300° C. or higher and 320° C. or lower.

Although the suitable embodiments according to the present invention have been described above with reference to the accompanying drawings, the present invention is not limited to such examples. The various shapes, combinations, and the like, of the constituent members shown in the above examples are merely examples, and various modifications can be made based on design requirements and the like without departing from the gist of the present invention.

EXAMPLES

Hereinafter, the present invention will be described with reference to Examples, but the present invention is not limited to these Examples.

Examples 1 to 9, Comparative Example 1

As a base film, a laminate was prepared in which a printing layer, a second intermediate layer, and a first layer were laminated in this order. The base film is a belt-like molded body, as shown in the production method for the resin laminate described above. Each configuration is shown below.

Structure of Base Film

Printing layer: A layer in which PET is used as a forming material, thickness: 12 μm Second intermediate layer: low-density polyethylene layer, thickness: 20 μm First film: Laminated film in which aluminum is vapor-deposited on a film layer using PET as a forming material (VM-PET manufactured by Toray Advanced Film Co., Ltd.), thickness: 12 μm, the layers were laminated with the aluminum vapor-deposited layer facing the second intermediate layer.

While transporting the base film in the longitudinal direction, the surface of the first layer of the base film (the surface on the side of the film layer in which PET is used as a forming material) was continuously subjected to atmospheric pressure plasma treatment under the following conditions.

Treatment Conditions

Output: 60 W·min/m$^2$

Atmospheric gas: Mixed gas of nitrogen and hydrogen. The concentration of hydrogen in nitrogen is 500 ppm.

Transport speed: 50 m/min

The surface of the base film subjected to atmospheric pressure plasma treatment was opposed to a belt-like second film, and a film-like molten resin (molten resin film) was extruded between the base film and the second film to perform extrusion lamination. The second film used was a molded body having a thickness of 90 μm and using linear low-density polyethylene (LLDPE) as a forming material.

In extrusion lamination, the surface of the molten resin film on the base film side was subjected to ozone treatment.

The molten resin film becomes the first intermediate layer described above. In the obtained resin laminate, the thickness of the first intermediate layer was 20 μm.

The thickness of the first intermediate layer was calculated by measuring the thickness (total thickness) of the resin laminate with a film thickness meter (constant pressure thickness measuring instrument), and excluding the thickness of the known (standard value for purchased film) base film and the second film from the total thickness.

After extrusion lamination, the obtained laminate was cut into sheets to obtain a resin laminate.

Examples 10 and 11

As a base film, a laminate was prepared in which a printing layer and a first layer were laminated in this order. The base film is a belt-like molded body, as shown in the production method for the resin laminate described above. Each configuration is shown below.

Structure of Base Film

First film: A film in which high-density polyethylene is used as a forming material Thickness: 25 μm Printing layer: An ink layer obtained by directly performing printing on the first film by the gravure method While transporting the base film in the longitudinal direction, the surface of the base film on the printing layer side was continuously subjected to atmospheric pressure plasma treatment under the following conditions.

Treatment Conditions

Output: 80 W·min/m$^2$

Atmospheric gas: Nitrogen

Transport speed: 50 m/min

The surface of the base film subjected to atmospheric pressure plasma treatment was opposed to a belt-like second film, and a film-like molten resin (molten resin film) was extruded between the base film and the second film to perform extrusion lamination. The second film used was a molded body having a thickness of 90 μm and using LLDPE as a forming material.

In extrusion lamination, the surface of the molten resin film on the base film side was subjected to ozone treatment.

The molten resin film becomes the first intermediate layer described above. In the obtained resin laminate, the thickness of the first intermediate layer was 20 μm.

After extrusion lamination, the obtained laminate was cut into sheets to obtain a resin laminate.

Example 12

As the second film, a laminate was used in which a coating layer of polyvinyl alcohol (PVOH) was provided on one side of a film (thickness: 90 μm) in which LLDPE is used as a forming material. The coating layer was a thin film with a thickness equal to or less than the measurable limit.

In extrusion lamination, a resin laminate was obtained in the same manner as in Example 10, except that the coating layer of the second film was on the molten resin side and both surfaces of the molten resin film were subjected to ozone treatment.

Table 1 shows the resins used in the extrusion laminates in Examples 1 to 9 and Comparative Example 1, that is, the resins constituting the first intermediate layer. The melt flow rate (MFR) and density of each resin are manufacturer's nominal values. Significant digits of each value are adjusted to the manufacturer's nominal values.

TABLE 1

| | Type | MFR (g/10 min) | Density (g/cm$^3$) |
|---|---|---|---|
| Resin A | Ethylene/α-olefin copolymer Product number: KC452T manufactured by Japan Polyethylene Corporation | 6.5 | 0.888 |
| Resin B | Linear low-density polyethylene Product number: BL600K manufactured by Tosoh Corporation | 21 | 0.898 |
| Resin C | Ethylene/α-olefin copolymer Product number: KF360T manufactured by Japan Polyethylene Corporation | 3.5 | 0.898 |
| Resin D | Ethylene/a-olefin copolymer Product number: KS560T manufactured by Japan Polyethylene Corporation | 16.5 | 0.898 |
| Resin E | Ethylene/α-olefin copolymer Product number: KF370 manufactured by Japan Polyethylene Corporation | 3.5 | 0.905 |
| Resin F | Ethylene/α-olefin copolymer Product number: KC573 manufactured by Japan Polyethylene Corporation | 15 | 0.910 |
| Resin G | Linear low-density polyethylene Product number: HL610K manufactured by Tosoh Corporation | 21 | 0.910 |
| Resin H | Linear low-density polyethylene Product number: HL500 manufactured by Tosoh Corporation | 14 | 0.899 |
| Resin I | Ethylene/α-olefin copolymer Product number: KJ640T manufactured by Japan Polyethylene Corporation | 30 | 0.880 |

TABLE 1-continued

| | Type | MFR (g/10 min) | Density (g/cm$^3$) |
|---|---|---|---|
| Resin J | Linear low-density polyethylene Product number: BL530K manufactured by Tosoh Corporation | 17 | 0.918 |
| Resin X | Low-density polyethylene Product number: L705 manufactured by Sumitomo Chemical Co., Ltd. | 7 | 0.919 |
| Resin Y | Low-density polyethylene Product number: DLZ19A manufactured by Tosoh Corporation | 8.0 | 0.919 |

The obtained resin laminate was evaluated as follows. For each of Examples 1 to 9 and Comparative Example 1, resin laminates were produced and evaluated under processing conditions in which the processing temperature of the molten resin during extrusion lamination was 300° C. and 320° C.

Peel Strength

The peel strength of the interface between the first intermediate layer and the base was measured according to the measurement method specified in JIS K 6854-1 "Adhesive Peel Adhesion Strength Test Method Part 1: 90 Degree Peel".

Tables 2 and 3 show the evaluation results. The temperatures described in the "peel strength" column of Tables 2 and 3 respectively indicate the processing temperature of the molten resin. "–" in the table indicates that data has not been acquired.

TABLE 2

| | First intermediate layer | | | Peel strength | |
|---|---|---|---|---|---|
| | | MFR | Density | (N/inch) | |
| | Resin | (g/10 min) | (g/cm$^3$) | 300° C. | 320° C. |
| Example 1 | Resin A | 6.5 | 0.888 | 19.2 | 14.9 |
| Example 2 | Resin B | 21 | 0.898 | 23.0 | 19.9 |
| Example 3 | Resin C/ Resin X | 4.2 | 0.9022 | 10.4 | 8.9 |
| Example 4 | Resin D/ Resin X | 14.6 | 0.9022 | 14.1 | 9.1 |
| Example 5 | Resin E/ Resin X | 4.2 | 0.9078 | 8.7 | 7.6 |
| Example 6 | Resin F | 15 | 0.910 | 10.5 | 8.3 |
| Example 7 | Resin G | 21 | 0.910 | 7.3 | 6.9 |
| Example 8 | Resin H | 14 | 0.899 | 9.9 | 5.6 |
| Example 9 | Resin I/ Resin Y | 24.5 | 0.8898 | — | 21.3 |
| Comparative Example 1 | Resin J | 17 | 0.918 | 2.9 | 2.4 |

TABLE 3

| | First intermediate layer | | | Peel strength |
|---|---|---|---|---|
| | | MFR | Density | (N/inch) |
| | Resin | (g/10 min) | (g/cm$^3$) | (300° C.) |
| Example 10 | Resin B | 21 | 0.898 | 5.2 |
| Example 11 | Resin A | 6.5 | 0.888 | 7.2 |
| Example 12 | Resin B | 21 | 0.898 | 5.0 |

When the first intermediate layer is a composition of two resins, the density of the resins constituting the first intermediate layer is determined by dividing the density of each of the two resins by the volume ratio of the resin used.

As a result of the evaluation, it was found that the resin laminates of Examples 1 to 12 had a peel strength of 5 N/inch or more, exhibiting sufficiently high peel strength.

On the other hand, it was found that the resin laminate of Comparative Example 1, in which the density of the resin constituting the first intermediate layer exceeded 0.915 g/cm³, had a weak peel strength without reaching 5 N/inch.

Moreover, the above tendency was the same even when the processing temperature was changed from 300° C. to 320° C.

Furthermore, in Examples 3 to 5 and 9, even when a resin having a density exceeding 0.915 g/cm³ was contained as the resin constituting the first intermediate layer, the density of the entire resin composition constituting the first intermediate layer was 0.915 g/cm³ or less. Since the resin laminates of Examples 3 to 5 and 9 also had a high peel strength, when the material of the first intermediate layer is a composition in which a plurality of resins are mixed, the density of the entire composition was found to be 0.915 g/cm³ or less.

From the above results, it was found that the present invention is useful.

According to the present invention, sufficient peel strength is exhibited, and thus, it is possible to suitably use the present invention for standing pouches, particularly standing pouches for liquids.

REFERENCE SIGNS LIST

1 Resin laminate
11 First layer
11a, 11b, 13a, 15a Surface
11F First film
12 Second layer
12F Second film
13F Molten resin film
14, 14F Printing layer
50 Packaging container

What is claimed is:
1. A resin laminate comprising:
at least a first layer;
a second layer; and
an intermediate layer laminated in contact with the first layer and the second layer, wherein
a surface of the first layer in contact with the intermediate layer is an oxidized surface formed by an atmospheric pressure plasma treatment under a nitrogen atmosphere or a mixed atmosphere of nitrogen and hydrogen,
at least a surface of the intermediate layer in contact with the first layer is an oxidized surface,
the first layer is a layer in which a thermoplastic resin is used as a forming material or a layer in which cellophane is used as a forming material,
the second layer forms an outermost surface of the resin laminate and functions as a sealant layer,
the intermediate layer is made of polyethylene having a density of 0.915 g/cm³ or less, and
the second layer is formed of a forming material selected from the group consisting of biodegradable resins, polyethylene, polypropylene, and cyclic polyolefins.

2. The resin laminate according to claim 1, wherein the thermoplastic resin is selected from the group consisting of polyethylene terephthalate, polyamide, polyethylene naphthalate, polyacrylonitrile, polycarbonate, polyimide, polyethylene, polypropylene, and cyclic polyolefins.

3. The resin laminate according to claim 1, wherein the forming material of the second layer is selected from the group consisting of polyethylene, polypropylene, and cyclic polyolefin.

4. The resin laminate according to claim 3, wherein the second layer has a main layer and a barrier coating layer provided on an intermediate layer side of the main layer.

5. The resin laminate according to claim 1, wherein the second layer is a layer in which a barrier material is used as a forming material.

6. The resin laminate according to claim 1, wherein the first layer has a barrier coating layer on the surface thereof.

7. The resin laminate according to claim 1, wherein the first layer is a layer in which a barrier material is used as a forming material.

8. The resin laminate according to claim 1, further comprising a printing layer laminated on the first layer.

9. The resin laminate according to claim 8, wherein the printing layer is provided between the first layer and the intermediate layer and wherein the first layer is in contact with the intermediate through the printing layer.

10. A packaging container in which the resin laminate according to claim 1 is used as a material, wherein the second layer faces an inside of the container.

11. The resin laminate according to claim 1, wherein the forming material of the second layer consist of the biodegradable resins selected from polylactic acid (PLA), polybutylene succinate (PBS), polybutylene succinate adipate (PBSA), and polybutylene adipate terephthalate (PBAT) and a poly(3-hydroxybutyrate-co-3-hydroxyhexanoate) copolymer resin (PHBH).

12. A resin laminate comprising:
at least a first layer;
a second layer; and
an intermediate layer laminated in contact with the first layer and the second layer, wherein
a surface of the first layer in contact with the intermediate layer is an oxidized surface formed by an atmospheric pressure plasma treatment under a nitrogen atmosphere or a mixed atmosphere of nitrogen and hydrogen of a solid thermoplastic resin or cellophane substrate, prior to lamination,
at least a surface of the intermediate layer in contact with the first layer is an oxidized surface,
the first layer is a layer in which a thermoplastic resin is used as a forming material or a layer in which cellophane is used as a forming material,
the second layer functions as a sealant layer,
the intermediate layer is made of polyethylene having a density of 0.915 g/cm³ or less, and
the second layer is formed of a forming material selected from the group consisting of biodegradable resins, polyethylene, polypropylene, and cyclic polyolefins.

* * * * *